(12) United States Patent
Chen

(10) Patent No.: US 9,760,519 B2
(45) Date of Patent: Sep. 12, 2017

(54) USB DEVICE AND METHOD FOR PROCESSING DATA BY USB DEVICE

(71) Applicant: Intel Corporation, Santa Clara, CA (US)

(72) Inventor: Kefeng Chen, Zhejiang (CN)

(73) Assignee: Intel Corporation, Santa Clara, CA (US)

( * ) Notice: Subject to any disclaimer, the term of this patent is extended or adjusted under 35 U.S.C. 154(b) by 282 days.

(21) Appl. No.: 14/625,005

(22) Filed: Feb. 18, 2015

(65) Prior Publication Data
US 2016/0004658 A1 Jan. 7, 2016

(30) Foreign Application Priority Data
Jul. 3, 2014 (CN) .......................... 2014 1 0315691

(51) Int. Cl.
*G06F 13/40* (2006.01)
*G06F 13/38* (2006.01)
*G06F 13/42* (2006.01)

(52) U.S. Cl.
CPC .......... *G06F 13/404* (2013.01); *G06F 13/387* (2013.01); *G06F 13/4068* (2013.01); *G06F 13/4282* (2013.01)

(58) Field of Classification Search
None
See application file for complete search history.

(56) References Cited

FOREIGN PATENT DOCUMENTS

| CN | 1190925 C | 2/2005 |
|---|---|---|
| CN | 101094148 A | 12/2007 |
| CN | 101490645 A | 7/2009 |
| CN | 101650694 B | 4/2012 |
| CN | 102591671 A | 7/2012 |
| CN | 103514119 A | 1/2014 |

OTHER PUBLICATIONS

English Translation of Chinese Patent CN101650694B.*
English Translation of Chinese Patent CN1190925C.*
Office Action received for Chinese Patent Application No. 201410315691.4, mailed on Jul. 29, 2016, 8 pages of Chinese Office Action.

* cited by examiner

*Primary Examiner* — Idriss N Alrobaye
*Assistant Examiner* — Dayton Lewis-Taylor
(74) *Attorney, Agent, or Firm* — Schiff Hardin LLP

(57) ABSTRACT

A universal serial bus device receives a data packet from a host. The universal serial bus device includes a first virtual device, a second virtual device and a data-assigning device. The data-assigning device performs a determination operation, including: transmitting data corresponding to the a first logical address to the first virtual device, when the first logical address is the same as an address of the first virtual device wherein the data corresponding to the first logical address and the first logical address are recorded in the data packet; transmitting data corresponding to the a second logical address to the first virtual device, when the first logical address is the same as an address of the first virtual device wherein the data corresponding to the second logical address and the second logical address are recorded in the data packet.

12 Claims, 6 Drawing Sheets

USB DEVICE AND METHOD FOR PROCESSING DATA BY USB DEVICE

CROSS REFERENCE TO RELATED APPLICATIONS

This Application claims priority of China Patent Application No. 201410315691.4, filed on Jul. 3, 2014, the entirety of which is incorporated by reference herein.

BACKGROUND OF THE INVENTION

Field of the Invention

The present invention relates to a USB device and in particular to a USB device that does not interrupt the current function being performed when other functions are added or removed.

Description of the Related Art

A Universal Serial Bus (USB) device or a USB device controller is widely applied in smart phones and is arranged to connect to a host, such as a personal computer, so as to interchange data with the host. The smart phone is regarded as a USB device with one or more functions when connecting to the host. After the smartphone is connected to the host, the user is unable to add or remove functions. For example, the smart phone is regarded as a USB device with a data-transmitting function when the smart phone is connected to the host. While connected, the smart phone is unable to additionally add a camera function. The connection between the smart phone and the host must be interrupted, if the camera function is to be additionally performed by the smart phone, so a descriptor relating to the camera function and the data-transmitting function is prepared by the host again. Then, the smart phone is able to perform the camera function and the data-transmitting function at the same time, when the connection between the smart phone and the host is re-built again. In short, the function currently being performed would be interrupted when the USB composite device adds or removes functions.

Therefore, there is a need to provide a new USB device and a method for processing data by the USB device to resolve the above problem.

BRIEF SUMMARY OF THE INVENTION

In view of this, an embodiment of the disclosure presents a USB device receiving a data packet from a host. The USB device comprises a first virtual device, a second virtual device, and a data-assigning device. The data-assigning device performs a first determination operation, comprising transmitting data, which is corresponding to a first logical address and is recorded in the data packet, to the first virtual device, when the first logical address, which is recorded in the data packet, is the same as the address of the first virtual device, such that the first virtual device communicates with the host. The first determination operation further includes transmitting data that corresponds to a second logical address and is recorded in the data packet to the second virtual device when the second logical address, which is recorded in the data packet, is the same as the address of the second virtual device, such that the second virtual device communicates with the host.

Another embodiment of the disclosure presents a method for processing a data by a USB device, to process a data packet from the host, such that the USB device switches from a first mode to a second mode without interrupting the function being performed under the first mode in advance. The method comprises configuring a first virtual device, a second virtual device, and a data-assigning device, wherein the data-assigning device is coupled to the first virtual device and the second virtual device; performing a first determination operation by the data-assigning device, the first determination operation comprising transmitting data, which is corresponding to a first logical address and is recorded in the data packet, to the first virtual device, when determining the first logical address, which is recorded in the data packet, is the same as the address of the first virtual device, such that the first virtual device communicates with the host; transmitting data, which is corresponding to a second logical address and is recorded in the data packet, to the second virtual device, when the second logical address, which is recorded in the data packet, is the same as the address of the second virtual device, such that the second virtual device communicates with the host.

The aforementioned USB device and the method would not interrupt the functions that are currently being performed by the aforementioned USB device when adding or removing functions.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
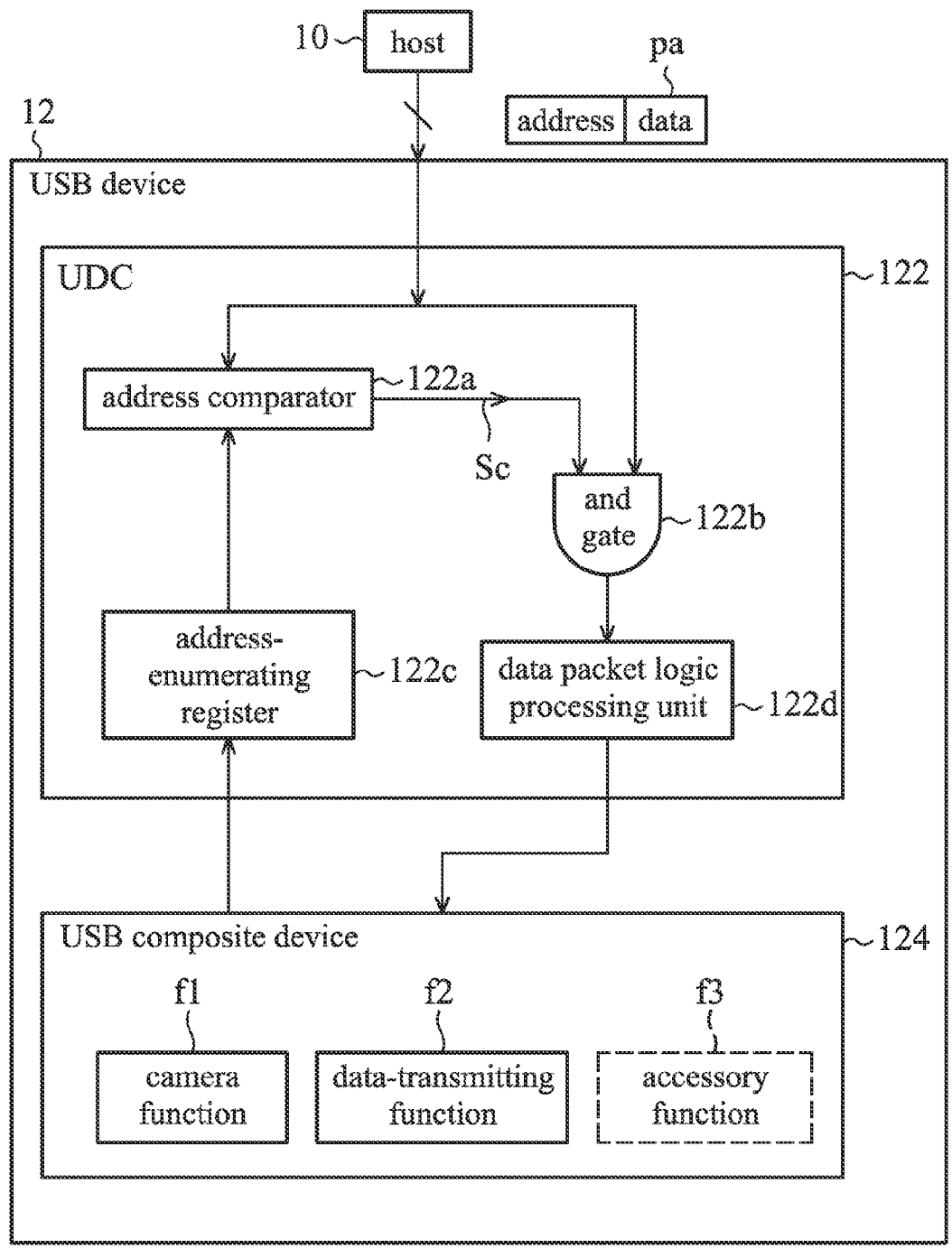
FIG. 1 is a diagram illustrating a USB device coupled to a host.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the invention are encompassed in the present invention. Like reference numerals in the drawings denote like elements. In the accompanying drawings, the dimensions of structures are exaggerated for clarity.

While such terms as 'first', 'second', and the like may be used to describe various elements, such elements should not be limited to the above terms. The above terms are used only to distinguish one element from another. For example, a first element may be referred to as a second element without departing from the scope of rights of the present disclosure, and likewise a second element may be referred to as a first element.

In the following description, the technical terms are used only for explain a specific exemplary embodiment while not limiting the present invention. The terms of a singular form may include plural forms unless referred to the contrary. The meaning of "include", "comprise", "including", or "comprising" specifies a property, a figure, a process, an operation, a component, a part, or combinations thereof but does not exclude other properties, figures, processes, operations, components, parts, or combinations thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a USB device 12 coupled to a host 10. The USB device 12 may be implemented in portable devices, smart phones, and tablets. The USB device 12 comprises a USB device controller (UDC) 122 and a USB composite device 124. The USB composite device 124 may be configured by running software installed in portable devices, smart phones, and tablets. The USB device 12 receives a data packet pa from the host 10. The data packet pa records addresses and data.

The UDC 122 comprises an address comparator 122a, an and gate 122b, an address-enumerating register 122c, and a data packet logic processing unit 122d. The address-enumerating register 122c is arranged to register the address of the USB composite device 124. The address comparator 122a is arranged to compare an address registered in the address-enumerating register 122c with an address recorded in the data packet pa, and output an indication signal Sc corresponding to the comparison result to the and gate 122b. The and gate 122b outputs the data packet pa to the data packet logic processing unit 122d when the indication signal Sc indicates that the address, which is registered in the address-enumerating register 122c is the same as the address, which is recorded in the data packet pa, such that the data packet logic processing unit 122d processes the data packet pa, and outputs a processed data packet pa to the USB composite device 124. The USB composite device 124 communicates with the host 10 according to the processed data packet pa.

Due to only one address being possessed by one virtual device, the single USB composite device 124 only possesses one address. The USB composite device 124 has a plurality of functions. The USB composite device 124 is assigned a new address when the USB composite device 124 adds or removes functions. For example, in one mode, the USB composite device 124 performs a camera function f1 and a data-transmitting function f2. At this time, the address of the USB composite device 124 is an address 1. The USB composite device 124 is going to perform a camera function f1, a data-transmitting function f2 and an additional accessory function f3 when switching from the mode to another mode. At this time, the address of the USB composite device 124 is reassigned to an address 2. The above characteristics of the USB composite device 124 lead to some disadvantages. The address of the USB composite device 124 is changed when adding or removing functions, and therefore the host 10 has to interrupt transmission with the USB device 12. The address recorded in the data packet pa is re-assigned by the host 10 from the address 1 to the address 2, and then the host 10 communicates with the USB device 12. In this way, the camera function f1 and the data-transmitting function f2 which are performed currently would be interrupted. In short terms, the USB device 12 configures all the functions into a single USB composite device 124, therefore resulting in the above problems. The USB device of the disclosure can solve the above problems.

Figure 2:
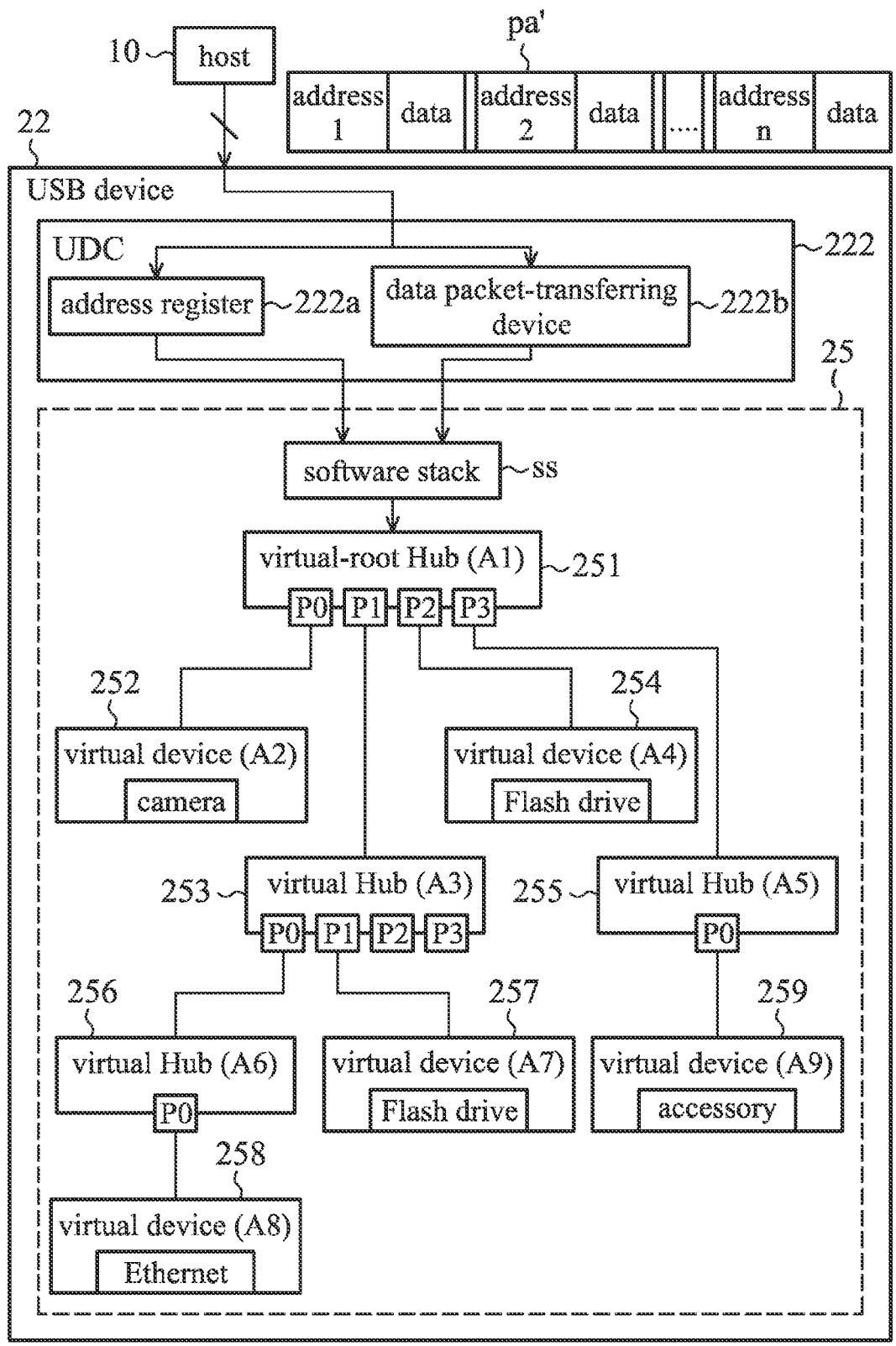
FIG. 2 is a diagram illustrating a USB device coupled to the host, according to an embodiment of the disclosure.

FIG. 2 is a diagram illustrating a USB device 22 coupled to the host 10, according to an embodiment of the disclosure. The Universal Serial Bus (USB) device 22 may be implemented in portable devices, smart phones, and tablets. The host 10 may be a personal computer or a physical Hub. The USB device 22 receives the data packet pa' from the host 10, and the data packet pa' records a plurality of groups of addresses and data. For example, a first group is an address 1 and data corresponding to the address 1. A second group is an address 2 and data corresponding to the address 2. An nth group is an address n and data corresponding to the address n, wherein n is a positive integer. The number n is decided by the number of functions being performed by the USB device 22. For example, the data packet records one group of addresses and data when the USB device 22 performs one function. The data packet records two groups of addresses and data when the USB device 22 performs two functions, and so on.

The USB device 22 comprises a physical device and a non-physical (i.e. virtual) device. The UDC 222 is the physical device, and devices included by a dotted line 25 are the non-physical devices. In the dotted line 25, a software stack ss may be configured by running software installed in portable devices, smart phones, and tablets. The software stack ss configures a plurality of functions of the USB device 22 into a plurality of virtual devices. For example, the software stack ss configures a camera function into a virtual device 252. The software stack ss configures a Flash drive function into virtual devices 254 and 257. The software stack ss configures an Ethernet function into a virtual device 258. The software stack ss configures an accessory function into a virtual device 259. The software stack ss configures a Hub function into a virtual root Hub 251 and virtual Hubs 253, 255 and 256. Compared with the USB composite device 124 in FIG. 1, the software stack ss of the disclosure only configures one function into one virtual device, rather than configuring all the functions of the USB device 22 into a single virtual device.

The aforementioned virtual devices each have their own address. In this embodiment, the address of the virtual root Hub 251 is A1. The address of the virtual device 252 is A2. The address of the virtual Hub 253 is A3. The address of the virtual device 254 is A4. The address of the virtual Hub 255 is A5. The address of the virtual Hub 256 is A6. The address of the virtual device 257 is A7. The address of the virtual device 258 is A8. The address of the virtual device 259 is A9.

Each virtual device has its own address, and therefore each virtual device is able to work independently. The functions which are performed currently would not be interrupted when the USB device 22 adds or removes functions. For example, in one mode, the data packet pa' output by the host 10 records the addresses A2 and A4, which are respectively the same as the address of the virtual devices 252 and 254, such that the USB device 22 performs the camera function and the Flash drive function. When switching from one mode to another mode, the data packet pa' output by the host 10 further records an address A9, which is the same as the address of the virtual device 259, such that the USB device 22 additionally performs an accessory function. The data packet pa' records the addresses A2 and A4 in both modes, and therefore the camera function and the Flash drive function are not interrupted.

To match the above configuration, the structure of a UDC 222 of the disclosure has also been changed, such that the UDC 222 of the disclosure is different from the structure of the UDC 122 of FIG. 1. The UDC 222 comprises an address register 222a and a data packet-transferring device 222b. The address register 222a is arranged to retrieve and store the address recoded by the data packet pa', and output the logical addresses to one of the software stack ss and the virtual root Hub 251. The data packet-transferring device 222b receives the data packet pa' from the host 10 and transfers the data packet pa' to one of the software stack ss and the virtual root Hub 251 without processing the data packet pa'.

The connecting relation of virtual devices below the software stack ss of FIG. 2 is further configured by the software stack ss. It is worthy of note that the structure of virtual devices shown in FIG. 2 in only exemplary, and the invention is not limited thereto. Many different structures of these virtual devices are able to be configured by the software stack ss.

Virtual devices with Hub function comprise the virtual root Hub 251, the virtual Hub 253, the virtual Hub 255, and the virtual Hub 256. Such virtual devices have virtual output ports.

The virtual root Hub 251 has four virtual output ports P0-P3, but the invention is not limited thereto. In an embodiment, the virtual root Hub 251 has seven virtual output ports. The virtual output port P0 is directly connected to the virtual device 252. The virtual output port P1 is directly connected to the virtual Hub 253. The virtual output port P2 is directly connected to the virtual device 254. The virtual output port P3 is directly connected to the virtual Hub 255 and indirectly connected to the virtual device 259 via the virtual Hub 255.

The virtual Hub 253 has four virtual output ports P0-P3, but the invention is not limited thereto. In an embodiment, the virtual Hub 253 has seven virtual output ports. The virtual output port P0 is directly connected to the virtual Hub 256 and indirectly connected to the virtual device 258 via the virtual Hub 256. The virtual output port P1 is directly connected to the virtual device 257.

The virtual Hub 255 has one virtual output port P0, but the invention is not limited thereto. In an embodiment, the virtual Hub 255 has seven virtual output ports. The virtual output port P0 is directly connected to the virtual device 259.

The virtual Hub 256 has one virtual output port P0, but the invention is not limited thereto. In an embodiment, the virtual Hub 256 has seven virtual output ports. The virtual output port P0 is directly connected to the virtual device 258.

Moreover, each of the virtual devices with Hub function comprising the virtual root Hub 251, the virtual Hub 253, the virtual Hub 255, and the virtual Hub 256 have their own list to list the mapping relation where virtual output ports map to virtual devices, which are directly or indirectly connected to the virtual output ports.

Table 1 shows the list of the virtual root Hub 251.

TABLE 1

| Virtual output ports | Address of virtual devices |
|---|---|
| P0 | A2 |
| P1 | A3 ` A6 ` A7 ` A8 |
| P2 | A4 |
| P3 | A5 ` A9 |

The virtual output port P0 maps to the address A2 of the virtual device 252, wherein the virtual output port P0 is directly connected to the virtual device 252. The virtual output port P1 maps to the address A3 of the virtual Hub 253, the address A6 of the virtual Hub 256, the address A7 of the virtual device 257, and the address A8 of the virtual device 258, wherein the virtual output port P1 is directly connected to the virtual Hub 253, and indirectly connected to the virtual Hub 256 and the virtual devices 257 and 258.

Table 2 shows the list of the virtual Hub 253.

TABLE 2

| Virtual output ports | Address of virtual devices |
|---|---|
| P0 | A6 ` A8 |
| P1 | A7 |
| P2 | — |
| P3 | — |

Likewise, the virtual Hubs 255 and 256 have their own list similar to the forgoing, and it is not described again herein.

Figure 3:
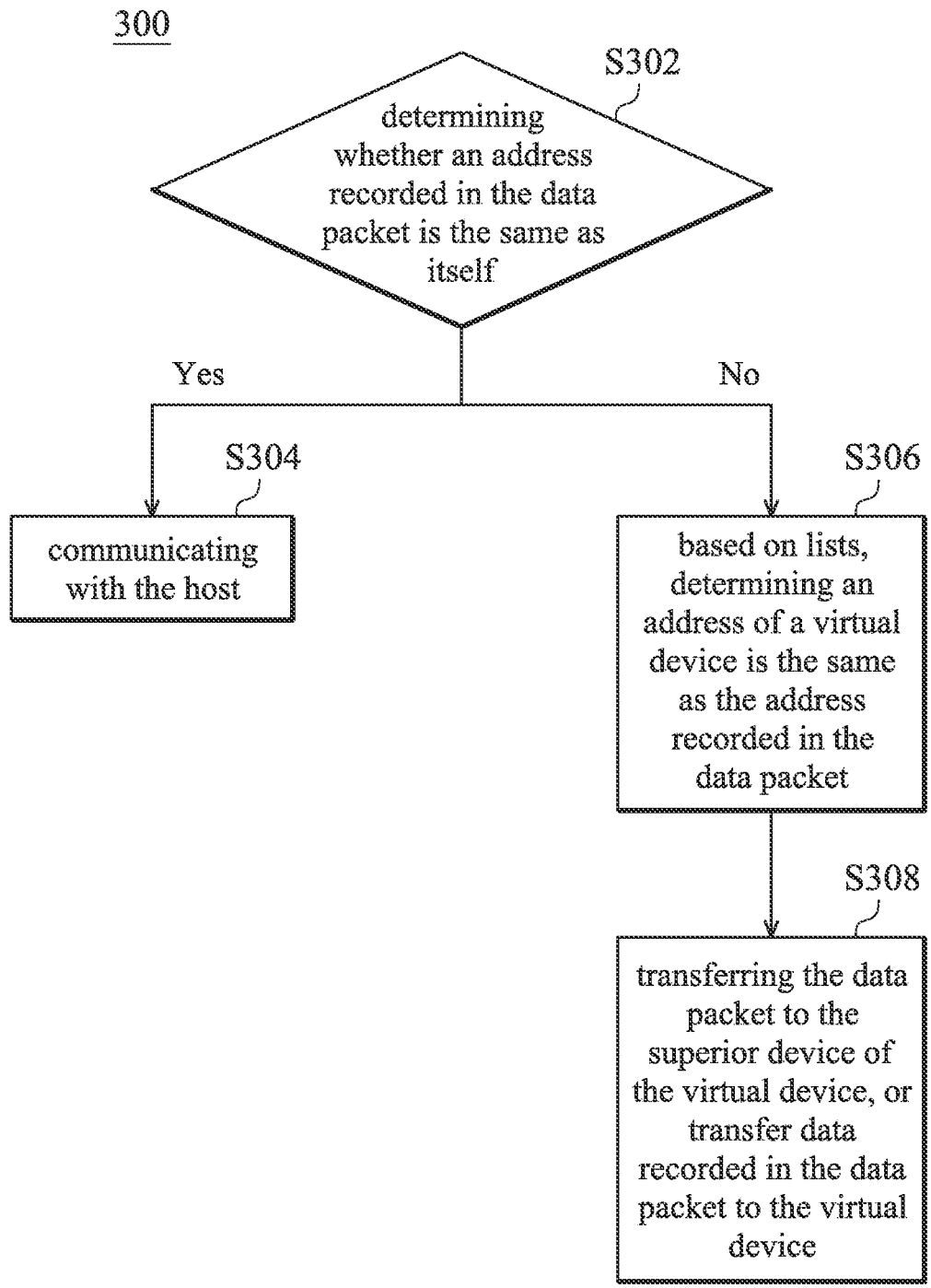
FIG. 3 illustrates the determination operation performed by the virtual devices with a Hub function, according to an embodiment of the disclosure.

A first embodiment where the USB device 22 of the disclosure processes the data packet pa' will be described in detail below. In this disclosure, the virtual devices with Hub function comprising the virtual root Hub 251, the virtual Hub 253, the virtual Hub 255 and the virtual Hub 256 are arranged to assign data recorded in the data packet pa'. In other words, such virtual devices are regarded as the data-assigning device. Moreover, such virtual devices perform a determination operation 300. FIG. 3 illustrates the determination operation 300 performed by the virtual devices with Hub function, according to an embodiment of the disclosure. The determination operation 300 comprises steps S302-S308. In step S302, the virtual devices with Hub function determine whether an address recorded in the data packet is the same as the virtual devices. If yes, the method proceeds to step S304. In step S304, the virtual devices with Hub function communicate with the host. If No, then the method proceeds to step S306. In step S306, based on lists, the virtual devices with Hub function determine that an address of a virtual device is the same as the address recorded in the data packet. In step S308, the virtual devices with Hub function transfer the data packet to the superior device of the virtual device, or transfer data recorded in the data packet to the virtual device.

In an embodiment, the address A1 and the data corresponding to the address A1 are recorded in the data packet pa'. The virtual root Hub 251 receives the data packet pa', and then performs the determination operation 300. In step S302, the virtual root Hub 251 determines whether the address A1 recorded in the data packet pa' is the same as itself. Due to the two addresses being the same, then the method proceeds to step S304. In step S304, the virtual root Hub 251 receives the data, which is recorded in the data packet pa' and is corresponding to the address A1, whereby communicating with the host 10 using the Hub protocol.

In another embodiment, the address A4 and the data corresponding to the address A4 are recorded in the data packet pa'. The virtual root Hub 251 receives the data packet pa', and then performs the determination operation 300. In step S302, the virtual root Hub 251 determines whether the address A4 recorded in the data packet pa' is the same as itself. Due to the two addresses being different, then the method proceeds to step S306. In step S306, based on the list as Table 1, the virtual root Hub 251 determines the address A4 recorded in the data packet pa' is the same as the address A4 of the virtual device 254. The determination operation 300 proceeds to step S308. In step S308, the virtual root Hub 251 transfers the data, which is recorded in the data packet pa' and corresponding to the address A4, to the virtual device 254, such that the virtual device 254 communicates with the host 10 to perform the Flash drive function. In short terms, the virtual root Hub 251 transmits the data corresponding to the address A4 to the virtual device 254 when determining that the address A4 recorded in the data packet pa' is not the same as its address A4, but is the same as the address A4 of the virtual device 254, whereby the virtual device 254 communicates with the host 10.

In another embodiment, the address A9 and the data corresponding to the address A9 are recorded in the data packet pa'. The virtual root Hub 251 receives the data packet pa', and then performs the determination operation 300. In step S302, the virtual root Hub 251 determines whether the address A9 recorded in the data packet pa' is the same as itself. Due to difference of two addresses, then proceeding to step S306. In step S306, based on the list as Table 1, the virtual root Hub 251 determines the address A9 recorded in the data packet pa' is the same as the address A9 of the virtual device 259. The determination operation 300 proceeds to step S308. In step S308, the virtual root Hub 251 transfers the data, which is recorded in the data packet pa' and corresponding to the address A9, to the superior device of the virtual device 259, i.e. the virtual Hub 255. Then, the virtual Hub 255 performs the determination 300 again, and finally transfers the data corresponding to the address A9 to the virtual device 259.

Each virtual device has its own address, and therefore each virtual device is able to work independently. The functions which are performed currently would not be interrupted when the USB device 22 adds or removes functions. In a mode, the data packet pa' records two groups of data and addresses. The first group is the address A2 and the data corresponding to the address A2. The second group is the address A4 and the data corresponding to the address A4. The virtual root Hub 251 performs the determination 300 to transfer the data corresponding to the address A2 to the virtual device 252, and transfer the data corresponding to the address A4 to the virtual device 254. When switching from the mode to another mode, the data packet pa' further records a third group of data and addresses. The third group is the address A9 and the data corresponding to the address A9. After the determination operation 300 is performed by the virtual root Hub 251 and the virtual Hub 255, the data corresponding to the address A9 is transferred to the virtual device 259, whereby the virtual device 259 communicates with the host 10. In this condition, the camera function, the Flash drive function and the additional accessory function are performed by the USB device 22 at the same time. The data packet pa' records the addresses A2 and A4 under both modes, and therefore the camera function and the Flash drive function are not interrupted.

Figure 4:
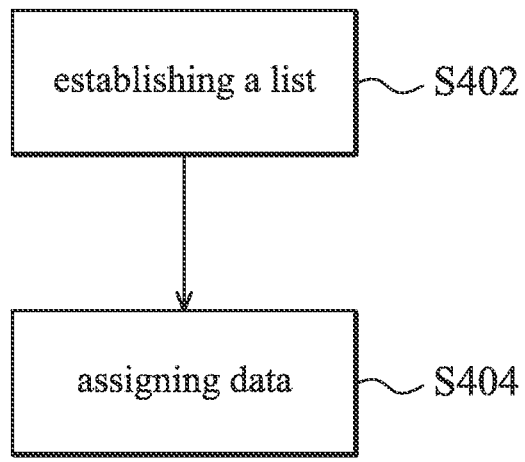
FIG. 4 illustrates a method for processing the data packet performed by the USB device, according to an embodiment of the disclosure.

A second embodiment where the USB device 22 of the disclosure processes the data packet pa' will be described in detail below. FIG. 4 illustrates a method 400 for processing the data packet pa' by the USB device 22, according to an embodiment of the disclosure. The method 400 comprises step S402 and step S404.

In step S402, the software stack ss establishes a list to record addresses of virtual devices, such as the virtual root Hub 251, the virtual device 252, the virtual Hub 253, the virtual device 254, the virtual Hub 255, the virtual Hub 256, the virtual device 257, the virtual device 258, the virtual device 259; and to record superior devices and subordinate devices of such virtual devices. The list is shown in Table 3.

TABLE 3

| addresses | Virtual devices | subordinate devices | superior devices |
|---|---|---|---|
| A1 | 251 | 252、253、254、255 | — |
| A2 | 252 | — | 251 |
| A3 | 253 | 256、257 | 251 |
| A4 | 254 | — | 251 |
| A5 | 255 | 259 | 251 |
| A6 | 256 | 258 | 253 |
| A7 | 257 | — | 253 |
| A8 | 258 | — | 256 |
| A9 | 259 | — | 255 |

The address A1 of the virtual root Hub 251, and the subordinate devices of the virtual root Hub 251 comprising the virtual device 252, the virtual Hub 253, the virtual device 254 and the virtual Hub 255 are recorded in the list. The address A3 of the virtual Hub 253, and the subordinate devices of the virtual Hub 253, comprising the virtual Hub 256, the virtual device 257, and the superior devices of the virtual Hub 253 comprising the virtual root Hub 251 are recorded in the list as well.

In step S304, based on the list, the software stack ss assigns the data recorded in the data packet'. In other words, the software stack ss is a data-assigning device. The approach of the second embodiment to assign the data is different from the first embodiment. In the second embodiment, the data is assigned by the software stack ss. In the first embodiment, the data is assigned by the virtual devices with Hub function. Moreover, in the second embodiment, addresses of the all virtual devices are recorded in the software stack ss, and therefore the data is able to be transferred to the virtual devices directly without performing the determination operation 300 of FIG. 3.

Figure 5:
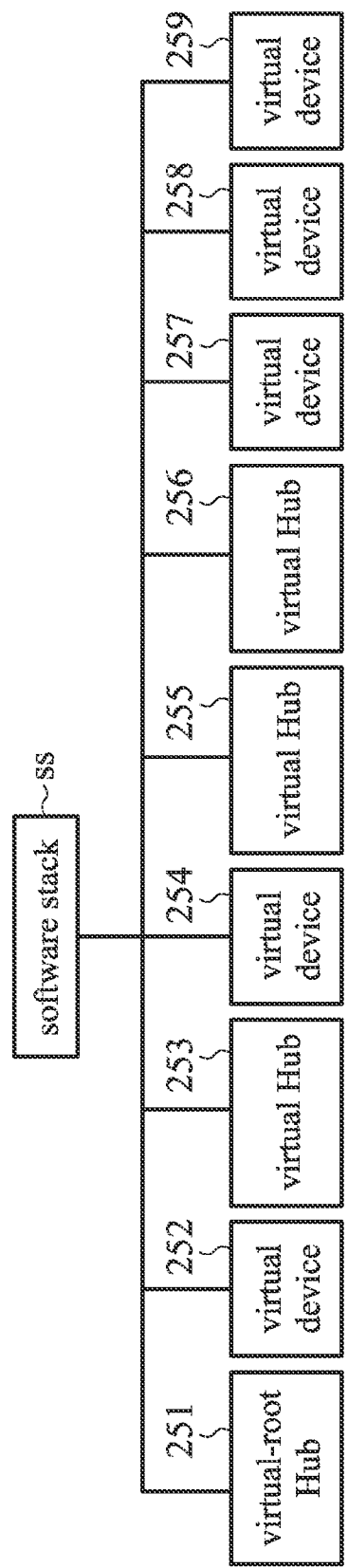
FIG. 5 is a diagram that illustrates the approach to assigning the data by the software stack, according to an embodiment of the disclosure.

The approach to assign the data by the software stack ss is shown in FIG. 5. FIG. 5 is a diagram that illustrates the approach to assign the data by the software stack ss, according to an embodiment of the disclosure. It is worthy of note that FIG. 5 is a diagram that only illustrates the assignment of the data, and the structure of these virtual devices is the same as FIG. 1.

Each virtual device has its own address, and therefore each virtual device is able to work independently. The functions which are performed currently would not be interrupted when the USB device 22 adds or removes functions. For example, in a mode, the data packet pa' records two groups of data and addresses. The first group is the address A2 and the data corresponding to the address A2. The second group is the address A4 and the data corresponding to the address A4. The software stack ss directly transfers the data, which is recorded in the data packet pa' and corresponds to the address A2, to the virtual device 252 when the software stack ss, based on the list as shown in Table 3, determines the address A2 recorded in the data packet pa' is the same as the address A2 of the virtual device 252, whereby the virtual device 252 communicates with the host 10 to perform the camera function. Likewise, the software stack ss directly transfers the data, which is recorded in the data packet pa' and corresponds to the address A4, to the virtual device 254 when the software stack ss, based on the list, determines the address A4 recorded in the data packet pa' is the same as the address A4 of the virtual device 254, whereby the virtual device 254 communicates with the host 10 to perform the Flash drive function. When switching from the mode to another mode, the data packet pa' transmitted by the host 10 further records a third group of data and addresses. The third group is the address A9 and the data corresponding to the address A9. The software stack ss transmits the data, which is recorded in the data packet pa' and is corresponding to the address A9, to the virtual device 259 when the software stack ss, based on the list, determines the address A9 recorded in the data packet pa' is the same as the address A9 of the virtual device 259, whereby the virtual device 259 communicates with the host 10 to perform the accessory function. The data packet pa' records the addresses A2 and A4 under both of modes, and therefore the camera function and the Flash drive function are not interrupted.

Figure 6:
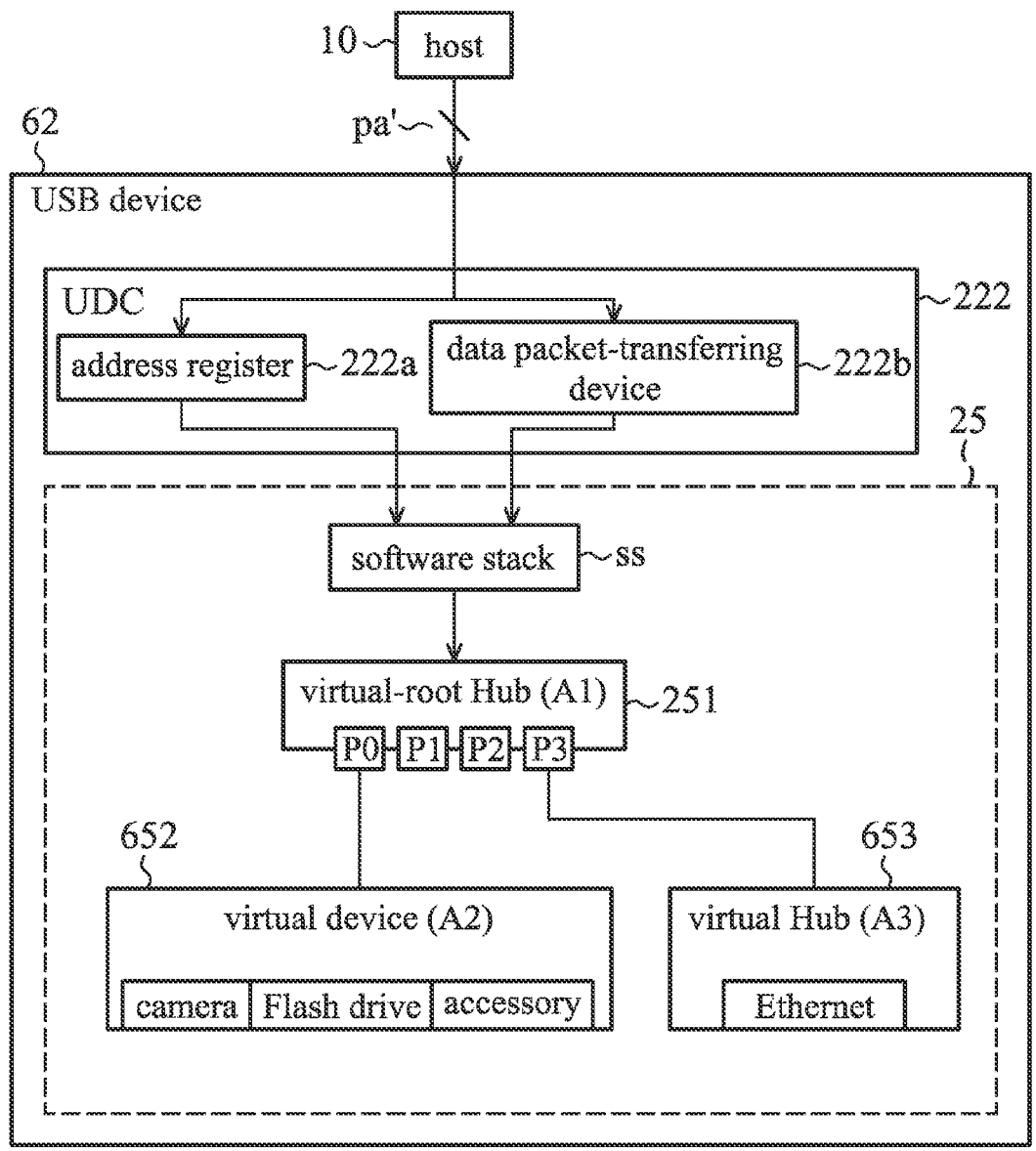
FIG. 6 illustrates a USB device coupled to the host, according to an embodiment of the disclosure.

FIG. 6 illustrates a USB device 62 coupled to the host 10, according to an embodiment of the disclosure. The difference between FIG. 6 and FIG. 1 is that the approach to configure functions of the USB device 62 is different from FIG. 1. More particularly, three functions of the USB device 62, such as the camera function, the Flash drive function and the accessory function, are configured into a single virtual device 652. This configuration is different from the configuration of the USB composite device 124 of FIG. 1. In FIG. 1, all functions of the USB device 12 are configured into a single virtual device. The virtual device 653 has only one function.

Each virtual device has its own address, and therefore each virtual device is able to work independently. The functions which are performed currently would not be interrupted when the USB device 62 adds or removes functions. For example, in a mode, the address A2 and the data corresponding to the address A2 are recorded in the data packet pa'. The virtual root Hub 251 transfers the data corresponding to the address A2 to the virtual device 652, whereby the virtual device 652 communicates with the host 10 to perform the camera function, the Flash drive function and the accessory function. When switching from the mode to another mode, the address A3 and the data corresponding to the address A3 is further recorded in the data packet pa'. The virtual Hub 251 transfers the data corresponding to the address A3 to the virtual device 653, whereby the virtual device 653 communicates with the host 10 to perform the Ethernet function. The data packet pa' records the address A2 under both of modes, and therefore the camera function, the Flash drive function and the accessory function are not interrupted.

A function, which is currently performed by the USB devices 22, 32 and 62, would not be interrupted when adding or removing functions.

The present invention may be at least partially embodied in the form of computer implemented processes and apparatus for practicing those processes. The present invention may also be at least partially embodied in the form of computer program code embodied in tangible machine readable storage media, such as random access memory (RAM), read only memories (ROMs), CD-ROMs, DVD-ROMs, BD-ROMs, hard disk drives, flash memories, or any other machine-readable storage medium, wherein, when the computer program code is loaded into and executed by a computer, the computer becomes an apparatus for practicing the invention. The present invention may be embodied at least partially in the form of computer program code, whether loaded into and/or executed by a compute, such that, when the computer program code is loaded into and executed by a computer, the computer becomes an apparatus for practicing the invention. When implemented on a general-purpose processor, the computer program code segments configure the processor to create specific logic circuits. The invention may alternatively be at least partially embodied in a digital signal processor formed of application specific integrated circuits for performing a method according to the principles of the invention.

Although the disclosed system and method have been described in terms of exemplary embodiments, they are not limited thereto. Rather, the appended claims should be construed broadly, to include other variants and embodiments of the system and method, which may be made by those skilled in the art without departing from the scope and range of equivalents of the system and method.

What is claimed is:

1. A universal serial bus device, receiving a data packet from a host, the universal serial bus device comprising:
   a virtual-root hub with a first set of virtual output ports;
   a first set of virtual devices and a first set of virtual hubs that are coupled to the virtual-root hub through the first set of virtual output ports, wherein the first set of virtual hubs further comprises a second set of virtual output ports;
   a second set of virtual devices and a second set of virtual hubs that are coupled to the first set of virtual hubs through the second set of virtual output ports,
   wherein the virtual-root hub performs a first determination operation comprising: transmitting data, which corresponds to a first logical address and is recorded in the data packet, to a particular virtual device of the first set of virtual devices, when the first logical address, which is recorded in the data packet, is the same as the address of the particular virtual device of the first set of virtual devices, such that the particular virtual device of the first set of virtual devices communicates with the host; transmitting data, which is corresponding to a particular virtual hub in the first set of virtual hubs and is recorded in the data packet, when the second logical address, which is recorded in the data packet, is the same as the address of the particular virtual hub in the first set of virtual hubs, such that the particular virtual hub in the first set of virtual hubs communicates with the host;
   wherein the particular virtual hub of the first set of virtual hubs further performs a second determination operation when the second logical address is not the same as the address of the particular virtual hub of the first set of virtual hubs, wherein the second determination operation determines the second set of virtual devices and the second set of virtual hubs that will communicate to the host through the second set of virtual output ports of the particular virtual hub that performed the second determination operation.

2. The universal serial bus device as claimed in claim 1, wherein the first determination operation further comprising: receiving the data corresponding to the first logical address, when determining the first logical address is the same as the address of the virtual root Hub, whereby the virtual-root hub communicates with the host.

3. The universal serial bus device as claimed in claim 1, wherein in response to the second determination operation, the particular virtual hub of the first set of virtual hubs transfers the data to the determined second set of virtual devices or the second set of virtual hubs that will communicate to the host through the second set of virtual output ports.

4. The universal serial bus device as claimed in claim 1, wherein the virtual-root Hub includes a first list, which lists a mapping relation between the first set of virtual output ports and the coupled second set of virtual devices and second set of virtual hubs, wherein each virtual hub of the second set of virtual hubs includes a second list comprising of a mapping relation between virtual output ports of each virtual hub and coupled third set of virtual devices and a third set of virtual hubs.

5. The universal serial bus device as claimed in claim 1, wherein each virtual device has a single function.

6. The universal serial bus device as claimed in claim 1, further comprising: a universal serial bus controller, coupled to the virtual-root hub, the universal serial bus controller comprises: an address register, arranged to retrieve the first logical address and/or the second logical address from the data packet, and assign the first logical address and/or the second logical address to the virtual-root hub; a data packet-transferring device, arranged to transfer the data packet from the host to the virtual-root hub.

7. A method for processing a data by a universal serial bus device, to process a data packet from the host, such that the universal serial bus device switches from a first mode to a second mode without interrupting the performed function under the first mode in advance, the method comprising:
configuring a data-assigning device to perform a first determination operation, wherein the data assigning device comprises a first set of virtual output ports to couple with a first set of virtual devices and a first set of virtual hubs, wherein the first set of virtual hubs is configured to perform a second determination operation and further comprises a second set of output ports to couple with a second set of virtual devices and a second set of virtual hubs;
performing a first determination operation by the data-assigning device, the first determination operation comprising: transmitting data, which is corresponding to a first logical address and is recorded in the data packet, to a particular virtual device of the first set of virtual devices, when determining the first logical address, which is recorded in the data packet, is the same as the address of the particular virtual device of the first set of virtual devices, such that the particular virtual device of the first set of virtual devices communicates with the host; transmitting data, which is corresponding to a particular virtual hub in the first set of virtual hubs and is recorded in the data packet, when the second logical address, which is recorded in the data packet, is the same as the address of the particular virtual hub in the first set of virtual hubs, such that the particular virtual hub in the first set of virtual hubs communicates with the host;
performing a second determination operation when the second logical address is not the same as the address of the particular virtual hub of the first set of virtual hubs, wherein the second determination operation determines the second set of virtual devices and the second set of virtual hubs that will communicate to the host through the second set of virtual output ports of the particular virtual hub that performed the second determination operation.

8. The method as claimed in claim 7, further comprising: configuring the data-assigning device into a virtual root Hub; performing the first determination operation by the virtual root Hub, wherein the first determination operation includes receiving the data corresponding to the first logical address, when determining the first logical address is the same as the address of the virtual-root Hub.

9. The method as claimed in claim 7, wherein in response to the second determination operation, the particular virtual hub of the first set of virtual hubs transfers the data to the determined second set of virtual devices or the second set of virtual hubs that will communicate to the host through the second set of virtual output ports.

10. The method as claimed in claim 7 further comprising: configuring a first list of the virtual root Hub, the first list listing a mapping relation between the first set of virtual output ports and the coupled second set of virtual devices and second set of virtual hubs, wherein each virtual hub of the second set of virtual hubs includes a second list comprising of a mapping relation between virtual output ports of each virtual hub and coupled third set of virtual devices and a third set of virtual hubs.

11. The method as claimed in claim 7, wherein each virtual device is configured to include a single function.

12. The method as claimed in claim 7, further comprising: receiving the data packet from the host by a universal serial bus controller; transmitting the data packet to the data-assigning device by the universal serial bus controller; retrieving the first logical address and/or the second logical address from the data packet, and assigning the first logical address and/or the second logical address to the data-assigning device.

* * * * *